United States Patent [19]
Sato et al.

[11] 4,190,947
[45] Mar. 4, 1980

[54] AUTOMATIC TOOL EXCHANGING APPARATUS OF MACHINE TOOL

[75] Inventors: Mituharu Sato; Katsuo Yamazaki, both of Numazu, Japan

[73] Assignee: Toshiba Kikai Kabushiki Kaisha, Tokyo, Japan

[21] Appl. No.: 954,308

[22] Filed: Oct. 24, 1978

[30] Foreign Application Priority Data

Nov. 4, 1977 [JP] Japan ............................... 52-132222

[51] Int. Cl.² .......................................... B23Q 3/157
[52] U.S. Cl. ...................................................... 29/568
[58] Field of Search ............ 29/568; 214/1 BB, 1 BC, 214/1 BD

[56] References Cited

U.S. PATENT DOCUMENTS

| | | | |
|---|---|---|---|
| 3,161,951 | 12/1964 | Anthony | 29/568 |
| 3,233,321 | 2/1966 | Anthony | 29/568 |
| 3,273,235 | 9/1966 | Dziedzic et al. | 29/568 |
| 3,516,149 | 6/1970 | Mickas | 29/568 |

FOREIGN PATENT DOCUMENTS 49-43285  4/1974  Japan ............................ 29/568

*Primary Examiner*—Z. R. Bilinsky
*Attorney, Agent, or Firm*—Koda and Androlia

[57] ABSTRACT

An automatic tool exchanging apparatus of a machine tool in which a new tool having heavy weight such as 60–100 kg are conveyed with its shank downwardly directed and readily and safely exchanged with a used tool. The apparatus comprises a tool storing magazine, a first tool exchanging mechanism located in front of the magazine, a horizontal tool conveying mechanism connected to the first tool exchanging mechanism, a vertical tool conveying mechanism, a second tool exchanging mechanism located on one side of the vertical tool conveying mechanism, and an intermediate tool pot mechanism for transferring the tool from the second tool exchanging mechanism to the spindle shaft of the machine tool after horizontally rotating the tool.

7 Claims, 23 Drawing Figures

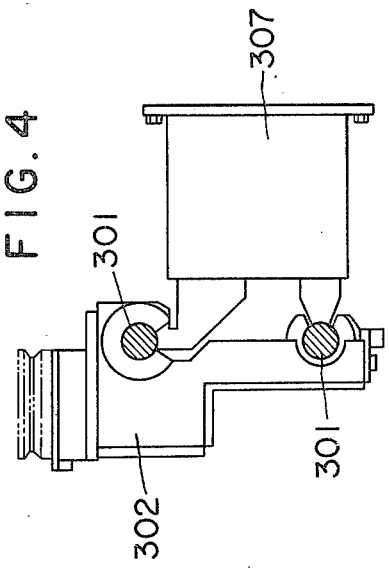
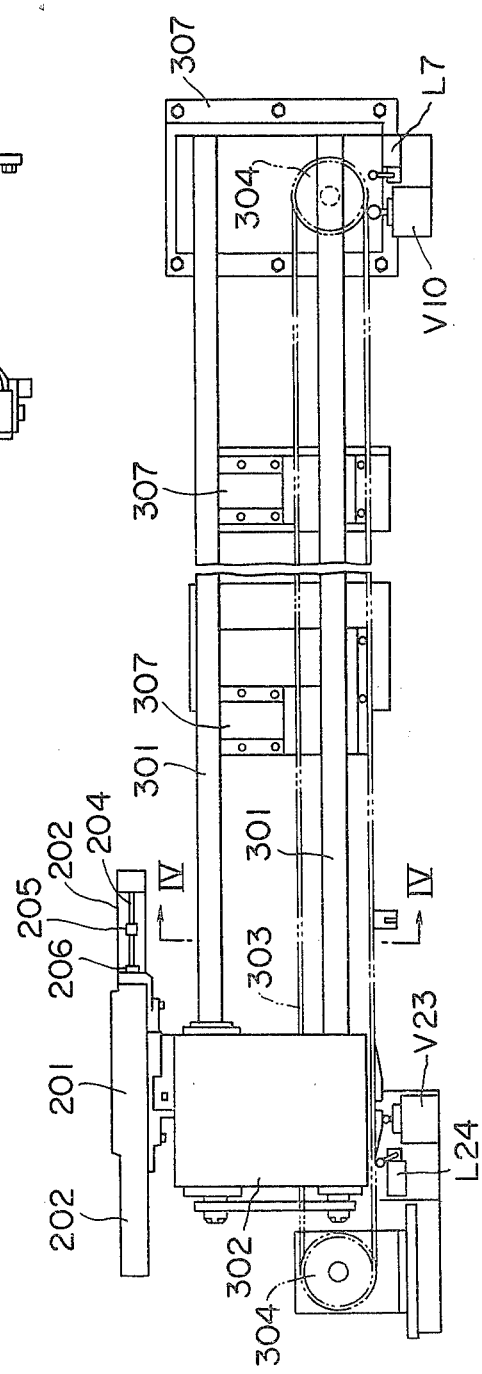

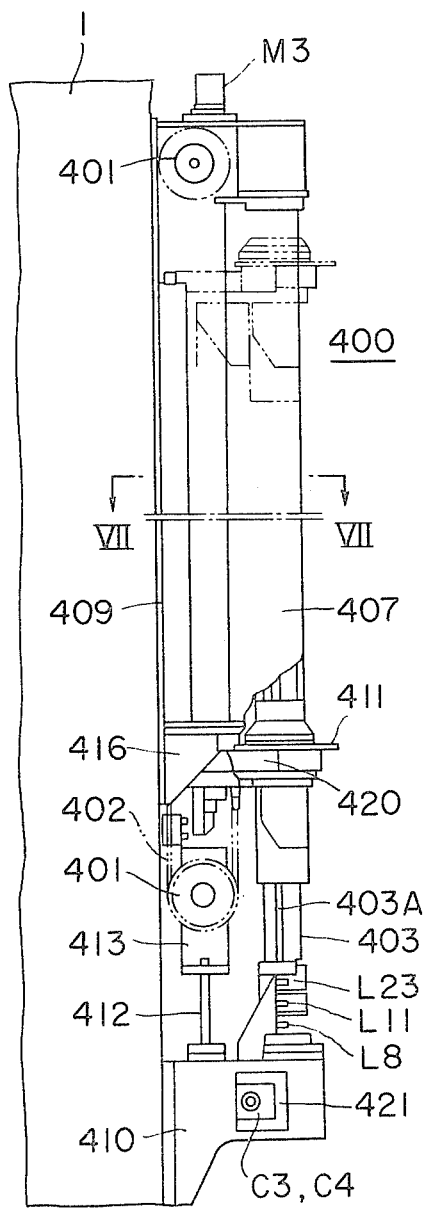
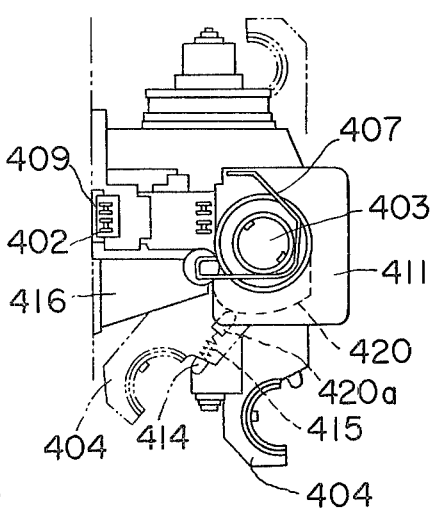

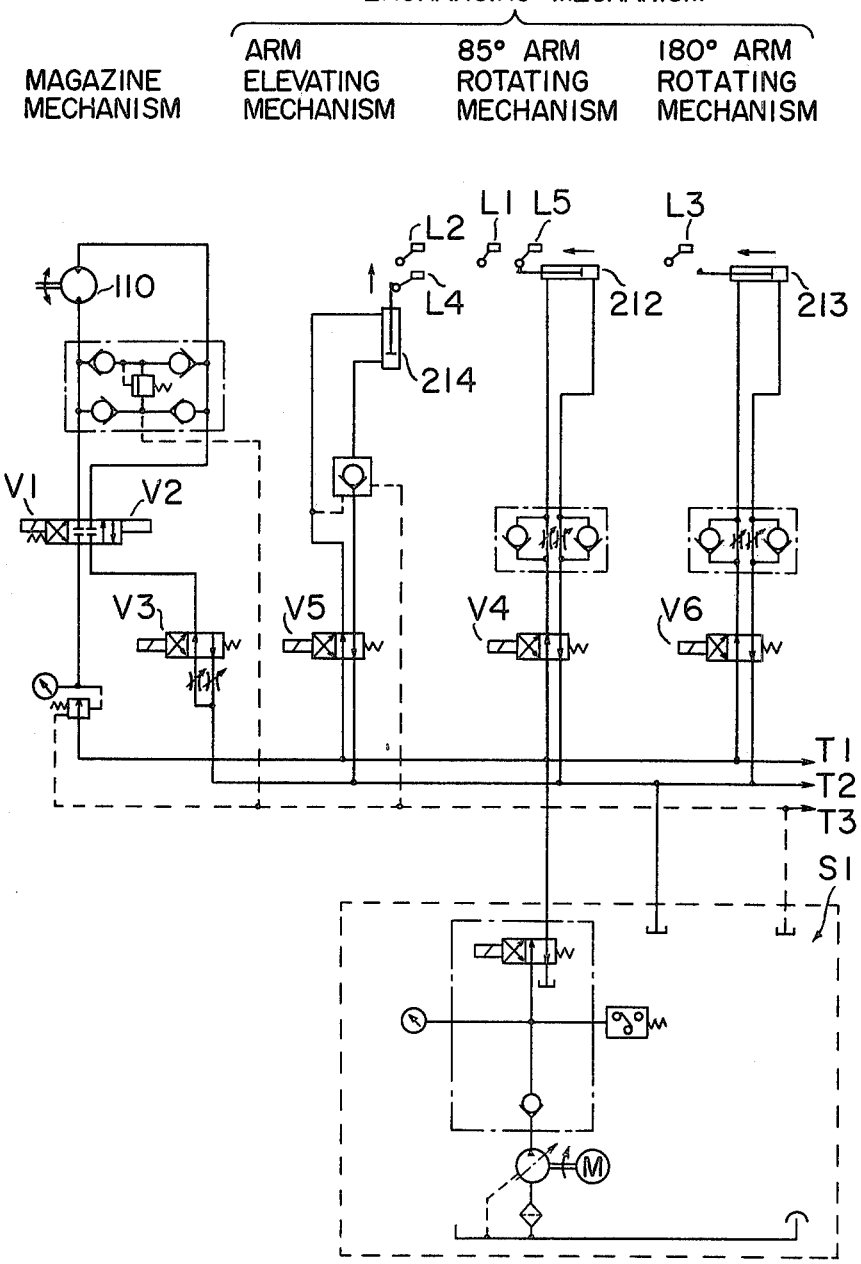

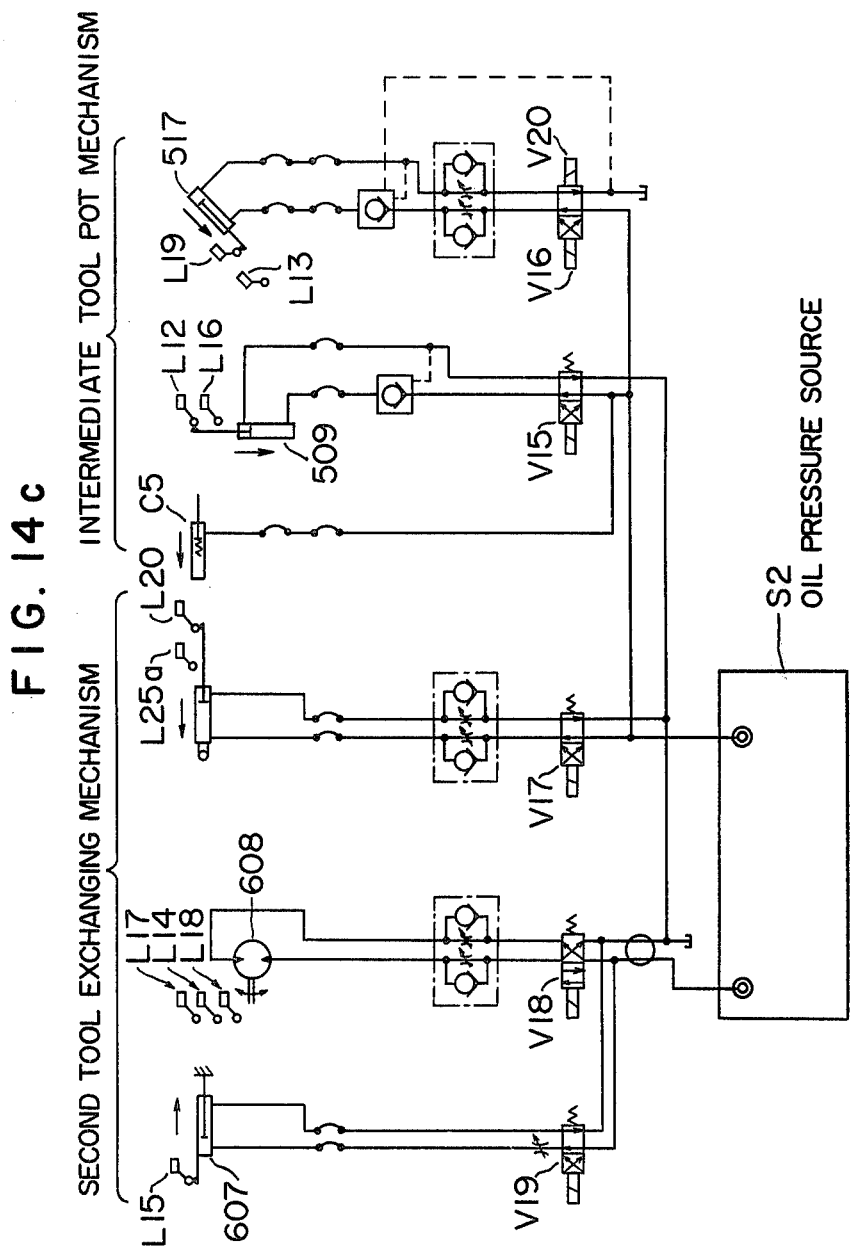

AUTOMATIC TOOL EXCHANGING APPARATUS OF MACHINE TOOL

BACKGROUND OF THE INVENTION

This invention relates to automatic tool exchanging apparatus of floor type horizontal milling and boring machines.

Usually, in an existing large size machine tool or a machining center, a tool has been directly exchanged between the spindle and a tool storing magazine arranged near a spindle head. However, in a large machine tool such as floor type horizontal milling and boring machines, since a tool having heavy weight (about 60 kg) and large diameter is used and the spindle of the machine must be displaced in a wide range in X-and Y-directions, it is hardly impossible to manually exchange the tool between spindle and the tool storing magazine in view of working ability and security because if the tool storing magazine is located on the side or top surface of the column of the machine tool having a large height, the receival and removal of tools into and out of the magazine requires much labour and dangerous manual operation.

In order to obviate above described defects, there has been proposed a machine tool, as disclosed in the Japanese Patent Laid Open Specification No. 43285/1974, in which a tool exchanging magazine is mounted on a column base, and tools are conveyed by a tool conveying device along first and second convyers to portion near the spindle head and are automatically exchanged by a tool exchanging arm mounted in the spindle head. However, in this machine, it is inevitable that tools each having a large dimension and a heavy weight are horizontally conveyed under unstable condition.

SUMMARY OF THE INVENTION

Accordingly, a main object of this invention is to obviate the defects described above and to provide an automatic tool-exchanging apparatus for such machine tools as floor type horizontal milling and boring machines, in which a tool is conveyed from a tool storing magazine in a vertical state with the holding portion of the tool being down-wardly directed along horizontal and vertical conveyers to an intermediate tool pot mechanism disposed one side of a spindle head and when the tool is received in the tool pot, it is rotated to take a position parallel to the axis of the spindle, whereby the tools in the tool pot and the spindle are exchanged with each other.

Another object of this invention is to provide an automatic tool exchanging apparatus, in which a tool is exchanged at any position in a predetermined range about the column where the spindle is moved.

A further object of this invention is to provide an automatic tool exchanging apparatus, in which a tool exchanging arm and an arm driving mechanism are rotatably located in a horizontal plane and the tool is exchanged at a position parallel to the axis of the spindle and waits at a position perpendicular to the axis when it is not exhanged.

According to this invention, these objects can be accomplished by providing an automatic tool exchanging apparatus of a machine tool having a base, a column mounted on the base, a spindle head located on one side of the column to be movable therealong and a spindle supported by the spindle head to be movable in the axial direction and the apparatus further comprises a tool storing magazine mounted on the base and provided with a number of tool pots in which tools are vertically supported with their shanks downwardly directed, a first tool exchanging mechanism located in front of a selected tool exchanging holder of the tool storing magazine when tools are to be exchanged, a horizontal tool conveying mechanism connected to the first tool exchanging mechanism and extending horizontally with respect to the magazine for horizontally conveying a tool with its shank downwardly directed, a vertical tool conveying mechanism connected to the horizontal tool conveying mechanism and extending along the column of the machine tool for vertically conveying the tool, a second tool exchanging mechanism located on one side of the vertical tool conveying mechanism for receiving a tool therefrom with its shank downwardly directed, and an intermediate tool pot mechanism pivotably supported on one side of the spindle head for transferring the tool from the second tool exchanging mechanism to the spindle after horizontally rotating the tool.

BRIEF DESCRIPTION OF THE DRAWINGS

In the accompanying drawings:

FIG. 3a is a front view of the horizontally tool conveying mechanism of the apparatus shown in FIG. 1;

FIG. 3b is a plan view of the tool exchanging arm assembly of the horizontally tool conveying mechanism shown in FIG. 3a;

FIG. 4 is a cross-sectional view taken along the line IV—IV in FIG. 3a;

FIG. 5 is a cross-sectional view of a cover for covering the conveyer of the horizontally tool conveying mechanism shown in FIG. 3a;

FIG. 6 is a front view, partially cut away, of the vertically tool conveying mechanism of the apparatus shown in FIG. 1;

FIG. 7 is a cross-sectional view taken along the line VII—VII in FIG. 6;

FIGS. 14a through 14c are diagrams showing hydraulic circuits for driving various mechanisms, of the apparatus in FIG. 1.

DESCRIPTION OF THE PREFERRED EMBODIMENT

Figure 1:
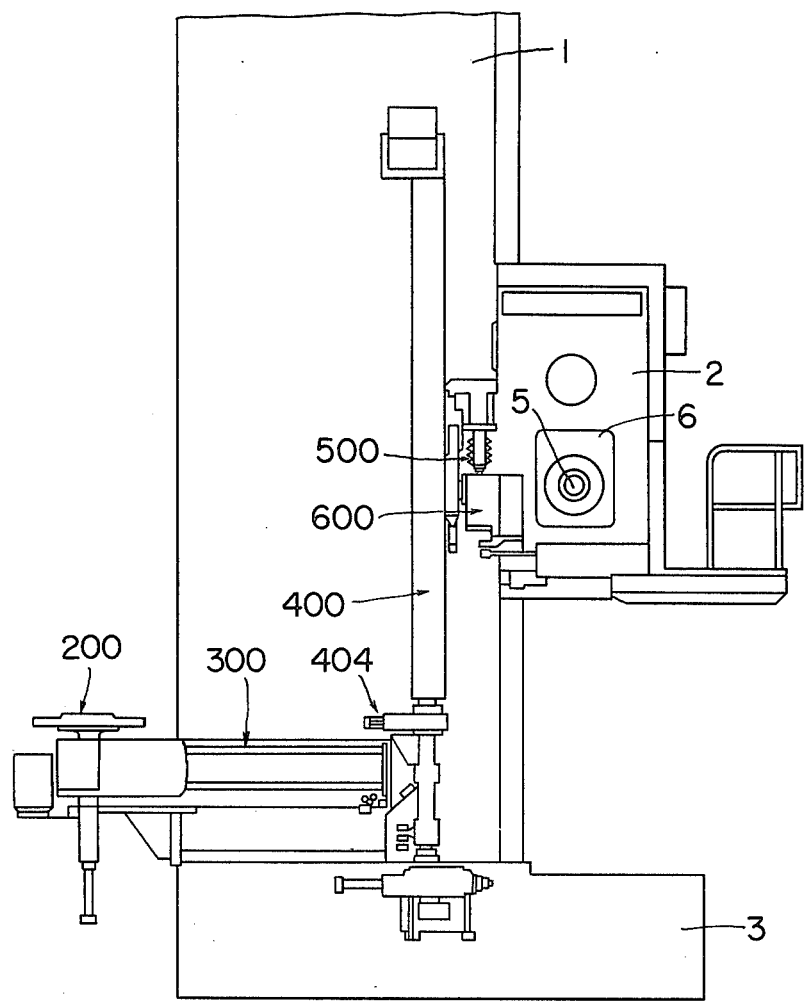
FIG. 1 shows a front view of an automatic tool exchanging apparatus according to this invention.
Figure 2:
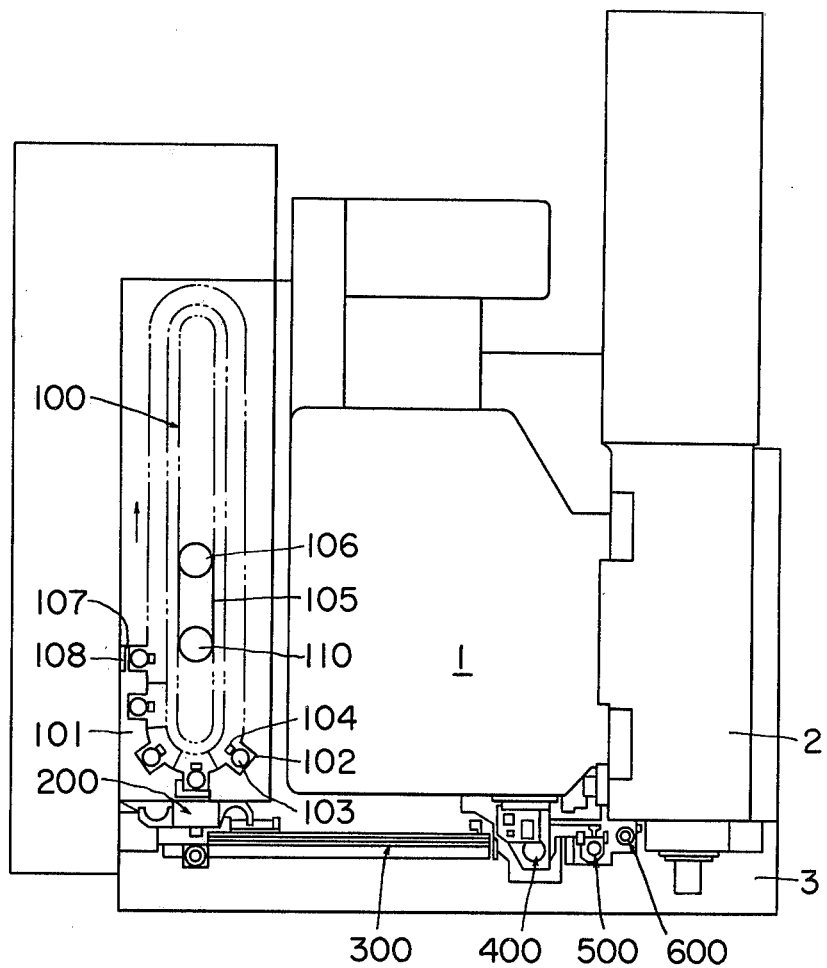
FIG. 2 shows a plan view of the apparatus shown in FIG. 1.
Figure 3B:
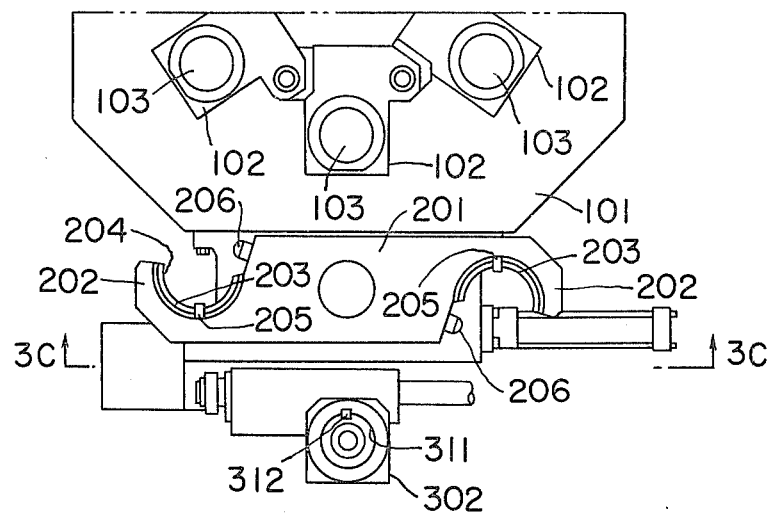
Figure 3C:
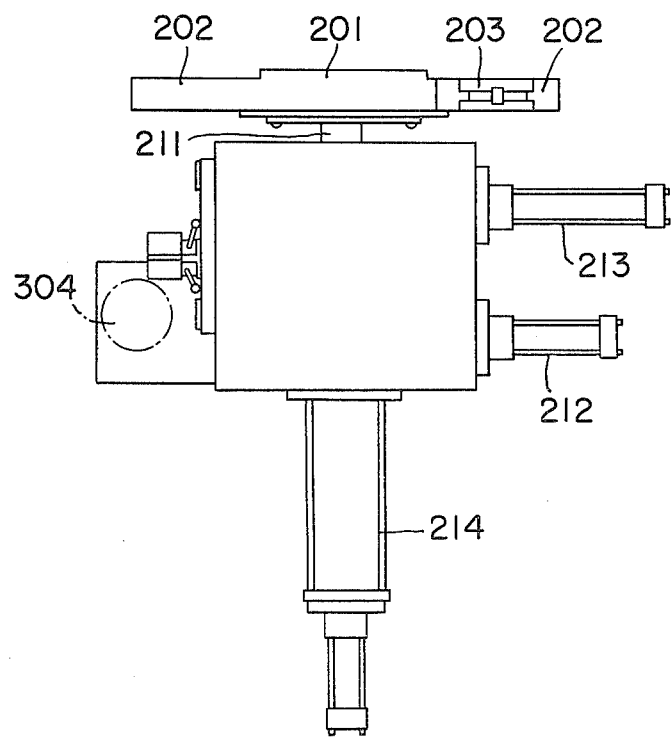
FIG. 3c is a cross-sectional view taken along the line 3c—3c in FIG. 3b.

FIGS. 1 and 2 show a front view and a plan view, respectively of the automatic tool exchanging apparatus of a floor type horizontal milling and boring machine, in which a spindle head 2 is mounted on one side of the column 1 of the machine tool to be movable in the vertical direction and a ram 6 movable fore-and-aft is mounted on the front surface of the spindle head 2. Within the ram 6 is supported a spindle 5 which is driven by a motor, not shown. The column 1 is mounted on a column base 3 to be movable laterally.

A tool storing magazine 100 (see FIG. 2) accommodating a number of tools is also mounted on the lefthand surface of the base 3. A horizontal tool conveying mechanism 300 is attached to the surface of the column for horizontally conveying a tool from the magazine 100 to position near the lower end of the spindle 5, and a first tool conveying mechanism 200 is arranged at the front end of the conveying mechanism 300. A vertical conveying mechanism 400 extending upwardly along the column 1 is arranged near the other end of the horizontal conveying mechanism 300 and an intermediate tool pot mechanism 500 is positioned on the side of the conveying mechanism 400. A second tool conveying mechanism 600 is arranged between the tool pot mechanism 500 and the spindle 5. The tool is transferred from the tool pot mechanism 500 to the spindle 5 as will be described later.

In the apparatus described above, the tool is conveyed in a vertical state with its shank portion being directed downwardly from the tool magazine 100 to the tool pot mechanism 500, and the tool is stably conveyed while maintaining the predetermined position by providing a positioning key groove for the tool which is adapted to engage with a positioning key provided for the conveying mechanism. When the tool is received in the tool pot mechanism 500, it is then horizontally rotated to take a position parallel to the spindle and exchanged with a tool which had been mounted on the spindle 5 and milling or boring a workpiece.

The mechanisms mentioned above will be described in detail hereunder, in conjunction with the accompanying drawings.

With reference first to FIG. 2, the tool storing magazine 100 includes a base 101 provided with an elliptical recess at the upper surface of its central portion and around the whole periphery of this recess, are provided a number of equally spaced tool pots 102 in a rotatable manner. An opening for inserting and holding a tool is formed at the central portion of the upper surface of each tool pot 102, and a key 104 is provided near the opening 103 to project inwardly of the recess so as to engage with the positioning groove of the tool to secure the tool at a predetermined position. A gear, not shown, is formed on the inside surface of the tool pot 102 to engage with a chain 105 disposed inside of the pot 102. Therefore, when the chain 105 is revolved by a sprocket 106 drive by a hydraulic motor 110, the tool pots 102 are rotated clockwisely, and in order to smoothly rotate the pots, there are provided extentions extending from the outside surfaces of the pots 102 to the base 101 and rolls carried by the extensions to roll on the surface of the base 101.

Code surfaces having different shapes are formed on the outer surfaces of the extensions of the tool pots 102, respectively for indexing the tools held in the vertical state by the openings 103 of the tool pots 102, and the rotation of the sprocket 106 is stopped by detecting a predetermined (selected) code surface 107 by a device 108 for detecting and discriminating the shape of the code surface 107 located on the base 101. Namely, when a pot 102 holding a desired tool is stopped at a portion near the tool exchanging position of the tool exchanging mechanism 200 to exchange the tools, since it is designed that the code surface corresponding to the desired tool is formed on one of the pots 102 preceeding the pot which holds the tool to be exchanged, the tool is stopped to the tool exchanging position by detecting the code surface of the predetermined preceeding tool pot 102. As the code surface detecting device 108, there may be used a device which mechanically contacts to and reads the code or an optical device which reads the light reflected by or transmitted through the code surface. Actually, the code surface is read after this pot 102 holding the desired tool has passed slightly by the key 104 and the tool exchanging position and the pot 102 has been stopped. The pot 102 is then slightly moved backwardly (anti-clockwisely) and again stopped in the position by a ratchet type stopping member.

Referring to FIGS. 1, and 2, and FIGS. 3a through 3c, the first tool exchanging mechanism 200 having a tool exchanging arm assembly 201 which serves to transfer the tool positioned at the tool exchanging position of the tool storing magazine 100 to the tool pot carrier 302 of the horizontal tool conveying mechanism 300 and to transfer the used tool in the tool pot carrier 302 into the pot 102 of the tool storing magazine 100. The tool exchanging arm assembly 201 is provided with arms 202 extending horizontally and having semi-circular holding portions 203 for holding the tools, respectively. The semi-circular holder 203 includes a semi-circular projection 204 to prevent the dropping out of the tool therefrom by engaging the ring-shaped groove of the tool and includes a key 205 to engage with the key groove of the tool for firmly holding the tool in position. A lock pin 206 is disposed near the base of the holder 203, the lock pin being always urged inwardly of the holder 203 by spring means, not shown.

A shaft 211 is secured to the lower surface of the arm assembly 201 and a pinion, not shown, attached to the lower end of the shaft 211 is meshed with one of racks provided for the piston rods of hydraulic cylinder-piston assemblies 212 and 213. Therefore, the arm assembly 201 is rotated when the hydraulic cylinder-piston operates. The shaft 211 is connected to a hydraulic cylinder-piston assembly 214 extending vertically, so that the arm assembly 201 can also move up and down.

When the arm assembly 201 is horizontally rotated and each of the tool holders 203 approaches the tool to be exchanged, the lock pin 206 is forced by the side surface of the tool and retracted into the arm assembly 201 against the force of the spring. Thus, the tool enters into the semi-circular tool holder 203 and engages with the arcuate projection 204 and the key 205. The tool is held so as not to disengage the holder by the lock pin 206 which has again been projected by the spring means.

The arm assembly 201 may be provided with two separate cantilever-type holders, one of which holding a new tool to be exchanged and the other holding the used tool.

The horizontal tool conveying mechanism 300 shown in FIGS. 3a, 3b, 3c, 4 and 5 serves to carry the tool with its shank downwardly directed in the vertical direction and to convey the tool from the first tool exchanging mechanism 200 to the vertical tool conveying mechanism 400. The tool pot carrier 302 is provided at its upper surface with a pot 311 to insert the shank of the tool and with a key 312 engaging the positioning key groove of the tool. The conveying mechanism 300 includes a pair of guide bars 301 spaced apart vertically with a predetermined distance. The guide bars 301 are supported by a guide bar support 307 secured to the column 1 so as not to disturb the movement of the pot carrier 302. An endless chain 303 is stretched in parallel with the guide bars 301 between a pair of sprockets 304 for driving the chain 303. The carrier 302 comprises horizontal holes through which the guide bars loosely penetrate, and the endless chain 303 is secured to the pot carrier 302. Thus, the carrier 302 is reciprocated along the guide bars 301 between the first tool exchanging mechanism 200 and the vertical conveying mechanism 400 by the operation of the sprockets 304 which are driven by a hydraulic motor, not shown, after the reduction of its rotating speed.

Figure 5:
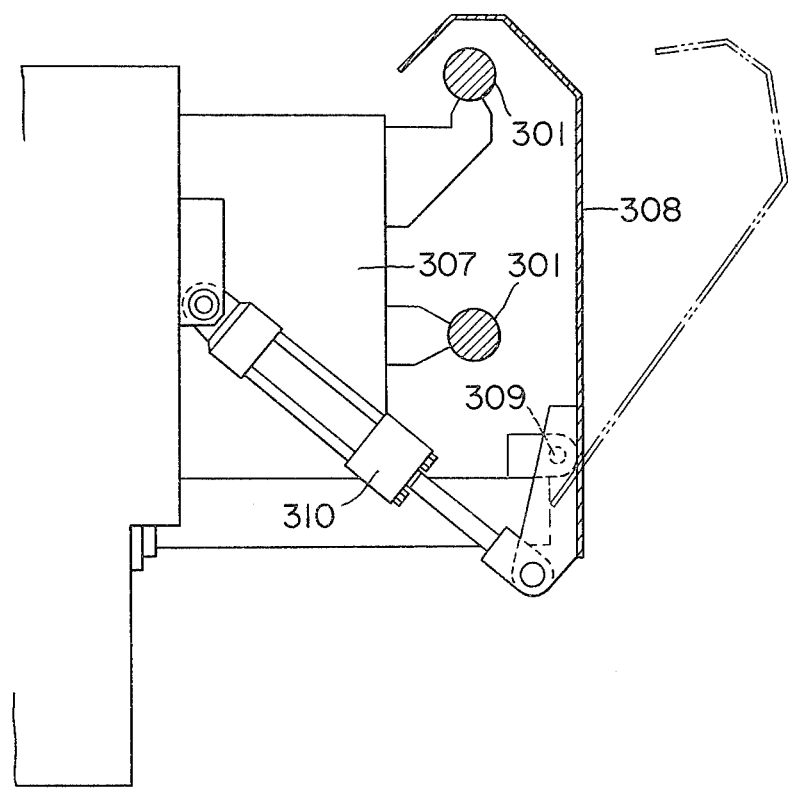

In order to protect the guide bars 301 from cut chips or dust, a cover 308 is attached as shown in FIG. 5. The cover 308 is made of a metal plate L-shaped in cross-section and its side and upper surfaces extend along the guide bars 301. The lower portion of the cover 308 is pivotably attached by a pin 309 to the projecting portion of the column 1 and connected to the piston of a hydraulic cylinder-piston assembly 300 with one end pivotably secured to the column 1. This construction permits the cover 308 to rotate to its open-position as shown by dotted lines in FIG. 5, and when the tool pot carrier 302 moves along the guide bars 301, the cover 308 is opened so as not to disturb the movement of the carrier 302.

In case of transferring a tool from the tool pot 102 of the tool storing magazine 100 to the tool pot carrier 302, the pot 102 holding the tool selected by the code surface detecting device is stopped at the predetermined tool exchanging position, i.e. the position of the lowermost pot 102 in FIG. 2, and at this time the pot carrier 302 has already reached its tool exchanging position shown in FIG. 3a. When the pot 102 and the carrier 302 have been stopped at their tool exchanging position, the arm assembly 201 is clockwisely rotated by 90° and the holders 203 hold the new tool in the pot 102 and the used tool in the carrier 302, respectively. At the next step, the arm assembly 201 moves upwardly (vertically with respect to the side of the column 1 in FIG. 2) to draw out both tools, rotate by 180° and move downwardly. In this manner, the new and used tools are exchanged and inserted into the carrier 302 and the pot 102, respectively, and after exchanging the tools, the arm assembly 201 again rotated by 90° to return to the original position.

Regarding the tool exchanging mechanism described above, since the pot 102 and the new tool to be exchanged are mutually related by the code surface 107, the used tool must be returned to the pot 102 after indexing the pot corresponding to the tool. However, in a system in which tools themselves are provided with code surfaces or an electric computer controls the desired tool and the positions of the pots 102, the used tool may be inserted in any vacant pot 102 in the tool storing magazine. In either system, the selection of the new tool and the pot has been performed in the milling or boring operation of the machine tool to shorten the time for exchanging the tools.

The vertical tool conveying mechanism 400 shown in FIGS. 6 and 7 has a rotary shaft 403 extending vertically along the side wall of the column 1. The rotary shaft 403 is rotatably supported by a supporting member 410 at its lower end and by a bearing, not shown, at its upper end. The rotary shaft 403 is rotated by predetermined angles by hydraulic cylinder-piston assemblies $C_3$ and $C_4$ disposed in the supporting member 410 such that the racks secured to the pistons of the assemblies $C_3$ and $C_4$ mesh with the pinions provided at the lower end of the rotary shaft 403. This rotary shaft is provided with a key groove 403A which engages with a key, not shown, of a tool conveying arm 404 which is movable up and down along the rotary shaft 403 and rotatable therewith.

The tool conveying arm 404, shown in detail in FIG. 7, comprises a member, at its front end, serving as a tool holder such as one holder 203 of the arm assembly 201 and this tool holder is provided with a circular projection, a key and a lock pin 414 so that the tool can be held vertically, with its shank downwardly directed. Although the lock pin 414 is constructed to be retractable when the tool is inserted into the holder of the arm 404, it is not retracted to engage with the lock pin 414, a spring 415, a cam 420 and a piece 420a when the arm 404 is brought to the position shown by solid lines and the position shown by upper imaginary lines in FIG. 7. Accordingly, when the arm 404 is positioned at these positions, the tool is firmly held in the holder of the arm 404. When the arm 404 is moved to the position shown by lower imaginary lines (inclined position in FIG. 7), the lock pin 414 is retractable because the piece 420a disengages from the surface of the cam 420.

A horizontal cover 411 is attached to the base of the tool conveying arm 404 to protect the rotating portion of the arm 404 from cut chips and dusts, and a vertical cover 407 is also attached to protect the rotary shaft 403. The cover 407 is disposed to the outside of the shaft 403 and extends vertically therealong, the base portion of the cover 407 is pivotally supported by a cover bracket 416, so that the cover 407 is rotatable in a horizontal plane. When the arm 404 is positioned at the lower end portion of the shaft 403 to receive the tool, the cover is rotated by a motor, not shown, located above the cover 407 and protect it from the cut chips or the like, and when the arm 404 moves upwardly, the cover 407 is rotated so as not to disturb the movement of the arm.

An endless chain 402 is stretched along the rotary shaft 403 and between the upper and lower sprockets 401. The upper sprocket is rotatated by a hydraulic motor located above the sprocket through a pinion, a worm and a worm wheel, not shown, and the lower sprocket is carried by a bracket 413 attached to a screw rod 412 projecting from the supporting member 410. Thus, the endless chain 402 is driven by the rotation of the upper sprocket 401. A portion of the endless chain 402 is connected to the tool conveying arm 404 thereby vertically moving the arm 404 in accordance with the movement of the chain 402 through the rotary shaft 403.

The conveyance of the tool from the tool pot carrier 302 of the horizontal tool conveying mechanism 300 to the tool conveying arm 404 is performed such that the arm 404 is first positioned to the lowermost position of the rotary shaft and occupies the position shown by the imaginary lines in FIG. 7. In this state, the pot carrier 302 is moved to the righthand end (in FIG. 3a). and the arm 404 is then rotated to the position shown by solid lines in FIG. 7, whereby the tool is caught and held by the holder of the arm 404.

Figure 8:
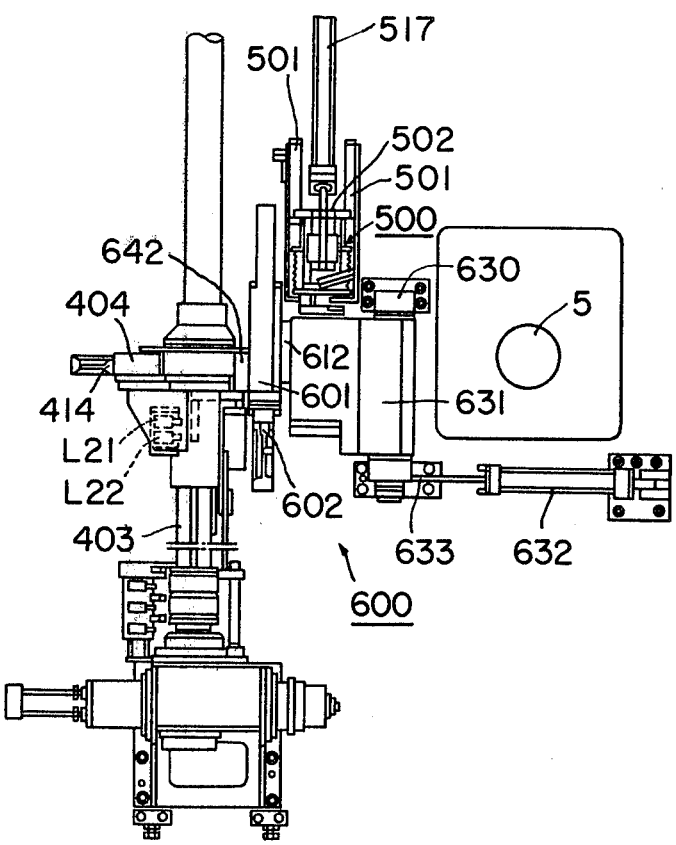
FIG. 8 is a front view of the tool conveying mechanism and mechanisms cooperating therewith.

As shown in FIG. 8, the intermediate tool pot mechanism 500 is located near the upper limit portion of the movement of the arm 404 along the side surface of the spindle head 2. The tool pot mechanism 500 can be tilted by 90°, as viewed in FIG. 8, towards a viewer and the tool pot 502 in this pot mechanism 500 is movable up and down along guide rails 501.

The tool exchanging arm 404 is stopped at a position corresponding to the position of the spindle head 2 within a predetermined stroke of the rotary shaft 403 by a limit switch described hereinafter. Namely, the spindle head 2 is provided with a projecting stopping member 642 and a limit switch $L_{10}$ attached to the lower portion of the stopping member 642. A dog for the limit switch $L_{10}$ is secured to the arm 404 and when the arm 404 moves upwardly and contacts the limit switch $L_{10}$, an electric signal is generated to stop the rotation of the hydraulic motor $M_3$, but the arm 404 further moves upwardly according to the inertia and stops at a predetermined position coresponding to the spindle head 2 when it abuts against the stopping member 642.

In the meantime, the conveyance of the tool from the arm 404 of the vertical tool conveying mechanism 400 to the tool pot 502 is performed such that the arm 404 moved upwardly along the rotary shaft 403 and stopped by the stopping member 642 is then rotated horizontally by 180° from the position shown in FIG. 8 to the right-hand side of the rotary shaft 403. In this positional relationship, the tool pot 502 is upwardly moved and the shank of the tool held vertically in the arm 404 is inserted into the pot 502. Then, the arm 404 is rotated clockwisely to the position shown by lower imaginary lines in FIG. 7 and the piece 420 a disengages the cam surface 420, whereby the tool is separated from the holder of the arm 404 against the force of the lock pin 414 and held only by the tool pot 502, and the tool pot 502 is tilted forwardly in FIG. 8 by 90°.

Figure 10:
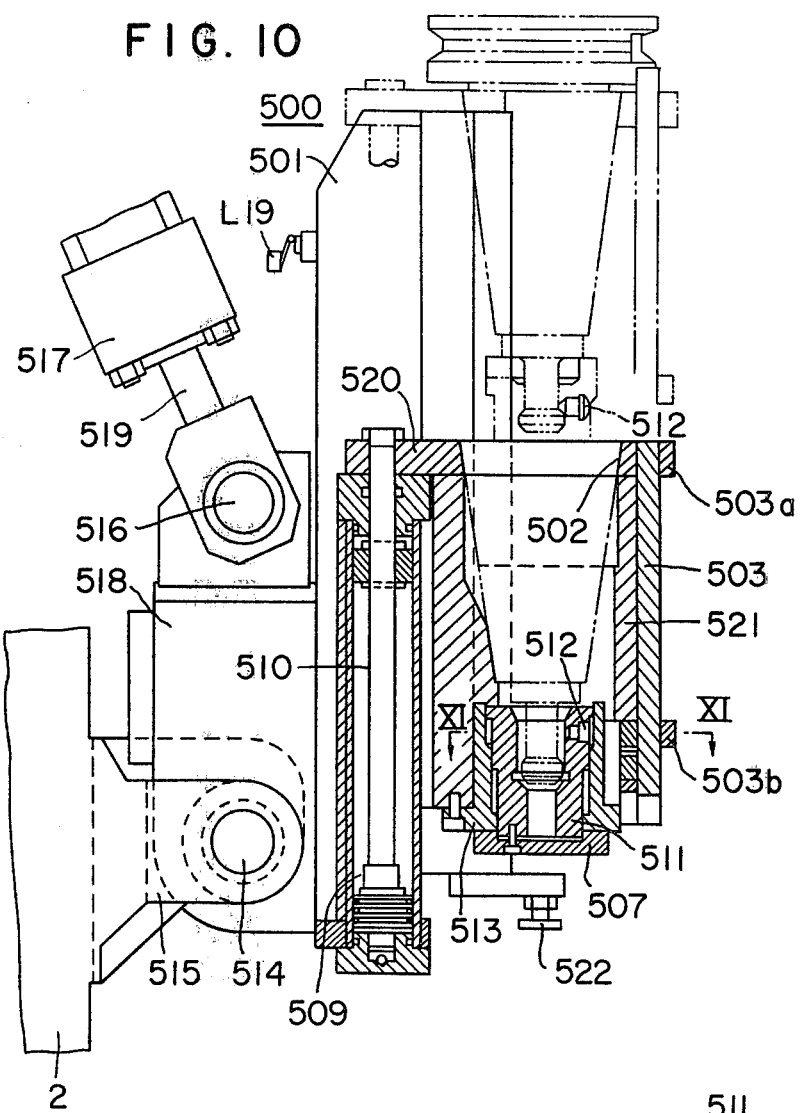
FIG. 10 is a cross-sectional view taken along the line X—X in FIG. 9.
Figure 11:
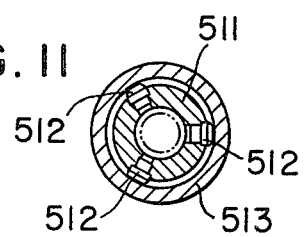
FIG. 11 is a cross-sectional view taken along the line XI—XI in FIG. 10.

In the following, the intermediate tool pot mechanism 500 will be described in detail with reference to FIGS. 9 through 11.

In the pot mechanism 500, the guide rails 501 are located in parallel with a constant distance and extend vertically. The lower ends of the rails are secured to a base plate 518 with its lower portion supported through a pin 514 by a support member 515 projected from the spindle head 2. The upper portion of the base plate 518 is pivotably supported through a pin 516 by the front end of the piston rod 519 of a hydraulic cylinder-piston assembly 517 rotatably attached to the spindle head 2.

According to this construction, the pot mechanism 500 can be rotated with respect to the spindle head 2 by 90° about the pin 514 by the hydraulic cylinder-piston assembly. A hydraulic cylinder-piston assembly 509 is vertically secured to the base plate 518, and one end of a flat supporting plate 520 provided at its central portion with an opening forming the entrance of the tool pot 502 is secured to the front end (i.e. upper end in FIG. 10) of the hydraulic cylinder-piston assembly 509. This opening of the pot 502 has substantialy the same diameter as that of the tool and is tapered downwardly, and on the upper end of a cylindrical member 521 coaxial with the opening of the plate 520 is secured to the lower surface of the supporting plate 520. The cylindrical member 521 is stably movable up and down along the guide rails 501, and the lower portion of the member 521 is tightly screwed to a cylindrical holder 513 fitted to the member 521. A tool pocket 511 is slidably located in the tool holder 513 and coaxialy with the holder 513, and the inner peripheral surface of the tool pocket 511 is formed so as to receive the pull-stud of the shank of the tool. A plate 507 having an extension abutting the lower surface of the holder 513 is bolted to the lower end of the pocket 511. A dog 522 is secured to the lower ends of the guide rails 501, which dog 522 serves to operate a limit switch, not shown, when the tool pot 502 is tilted by 90° by the hydraulic cylinder-piston assembly 517 to assume the horizontal position of the pot 502.

Figure 9:
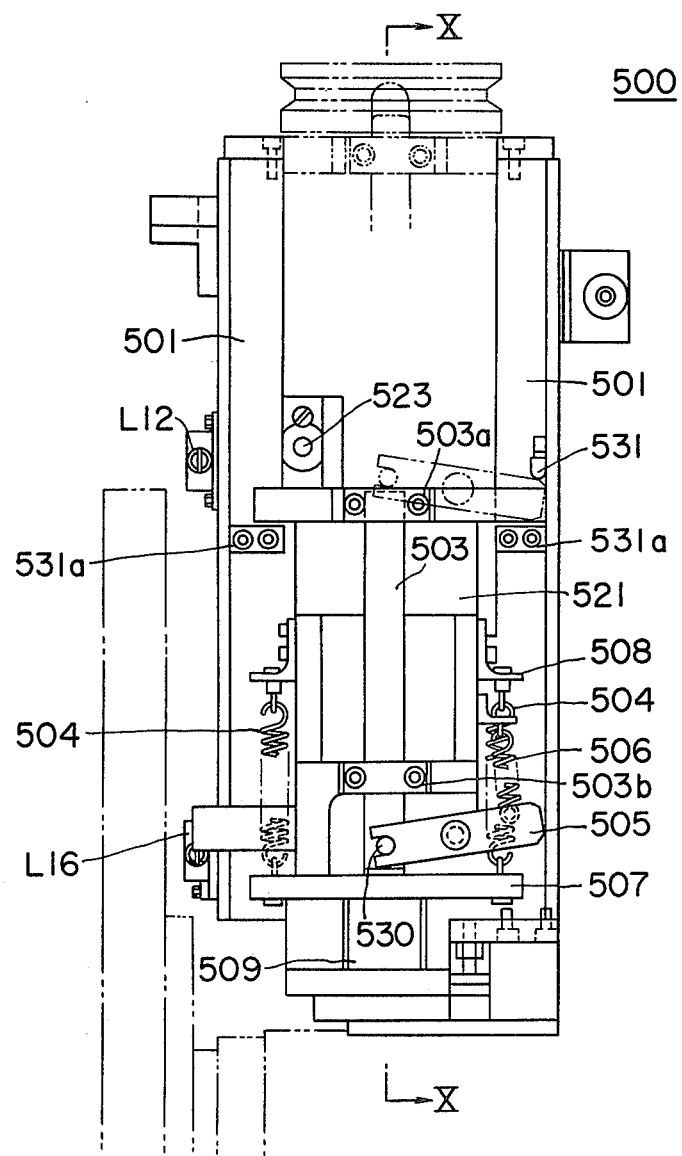
FIG. 9 is a front view of the intermediate tool pot mechanism of the apparatus shown in FIG. 1.

As shown is FIG. 9, the lower ends of tension springs 504 are connected to the both ends of a plate 507, respectively, and the upper ends of the springs 504 are connected to a ring-shaped support plate 508 extending from the outer surface of a cylindrical member 521. According to the construction described above, the tool pocket 511 mounted on the plate 507 is upwardly moved in accordance with the upward movement of the supporting plate 520 caused by the movement of the piston rod 510, and when the pocket 11 moves upwardly and approaches near its uppermost position, the tool is inserted into the pot 502 and the both ends of the plate 507 abut to a stopping member 531a, thus stopping the upward movement of the pocket 511. However, the supporting plate 520 is further moved upwardly a little independently of the movement of the pocket 511. Thus, the shank of the tool is securely held in the pocket 511 by the operation of a shank supporting mechanism, which is described in conjunction with FIGS. 10 and 11.

The shank supporting mechanism is provided with a plurality of lock pins 512 slidably pressed into radial horizontal bores formed on and spaced equally from the peripheral wall of the tool pockets 511. Three bores are formed in this embodiment as shown in FIG. 11. The head of these lock pins 512 are fitted into annular recesses formed in the inside surface of the holder which are slightly tappered at portions corresponding to the recesses as shown in FIG. 10, and normally the front ends of the lock pins 512 do not project into the pocket 511, thus being under non-locked condition. When the pocket 511 is stopped near its uppermost position by the stopping member 531a in a manner described before and when the holder 513 further moves upwardly, the lock pins 512 are pushed forwardly from the bottoms of the recesses of the holders 513 because of the tapered inside surface of the holder 513. Thus, the projected lock pins 512 abut the pull stud, shown by dotted lines in FIG. 10, of the tool and support it in radical directions thereby locking the tool.

The intermediate tool pot mechanism 500 further includes a mechanism for engaging with the key groove of the tool and positioning the rotary position of the tool. This mechanism comprises, as shown in FIG. 9, a bar 503 which is held to be vertically slidable but not rotatable by a pair of clamping plates 503a and 503b with respect to the side wall of the cylindrical member 521. The bar 503 is provided at its lower portion with a projecting pin 530 in engagement with a notch formed at the front end of a swing lever 505 which is pivotably supported at its central portion by the cylindrical member 521, and the base portion of the lever 505 is connected to the lower end of the tension spring 506, the upper end of which being fixed to the member 521.

According to this construction, when the cylindrical member 521 occupies the lowered position as shown by solid lines in FIG. 9, the lever 505 is urged to clockwisely rotate by the spring 506 and the upper front end of the bar 503a does not project beyond the upper surface of the supporting plate 520. This is un-locked condition. When the cylindrical member 521 is moved upwardly as shown in FIG. 9 by imaginary lines, right-hand end of the lever 505 engages with the stopping member 531 attached to the intermediate portion of the guide rail 501, and the lever 505 is clockwisely rotated against the force of the spring 506. At this time, the upper end of the bar 503 projecting from the supporting plate 520 engages with the key groove of the tool in the tool pot 502, thus, securely positioning the tool and preventing the rotation thereof. This is the locked state.

The second tool exchanging mechanism 600 performing the tool-exchange of the new tool in the tool pot 502 tilted by 90° in the horizontal direction with the used tool on the spindle 5 will be described hereunder with reference to FIGS. 8, 12 and 13a through 13f.

Referring to FIG. 8, the second tool exchanging mechanism 600 is positioned beneath the mechanism 500. The second tool exchanging mechanism 600 includes a swing block 631 containing a drive mechanism for rotating a tool exchanging mechanism 601. This block 631 is horizontally supported to be rotatable by 90° with respect to the spindle head 2. The block 631 also includes a rotary shaft having a pinion at its lower end which is meshed with a rack provided for one end of the piston rod 633 of a hydraulic cylinder-piston assembly 632 connected to the spindle head 2. Therefore, when the piston rod 633 moves rightwardly from the position shown in FIG. 8, the block 631 is rotated to rotate the arm 601 by 90°. The exchanging arm 601 and a cylindrical hollow shaft 612 thereof are positioned in the same horizontal plane as the spindle 5 positioned on the side of the block 631 near the rotary shaft 403.

Figure 12:
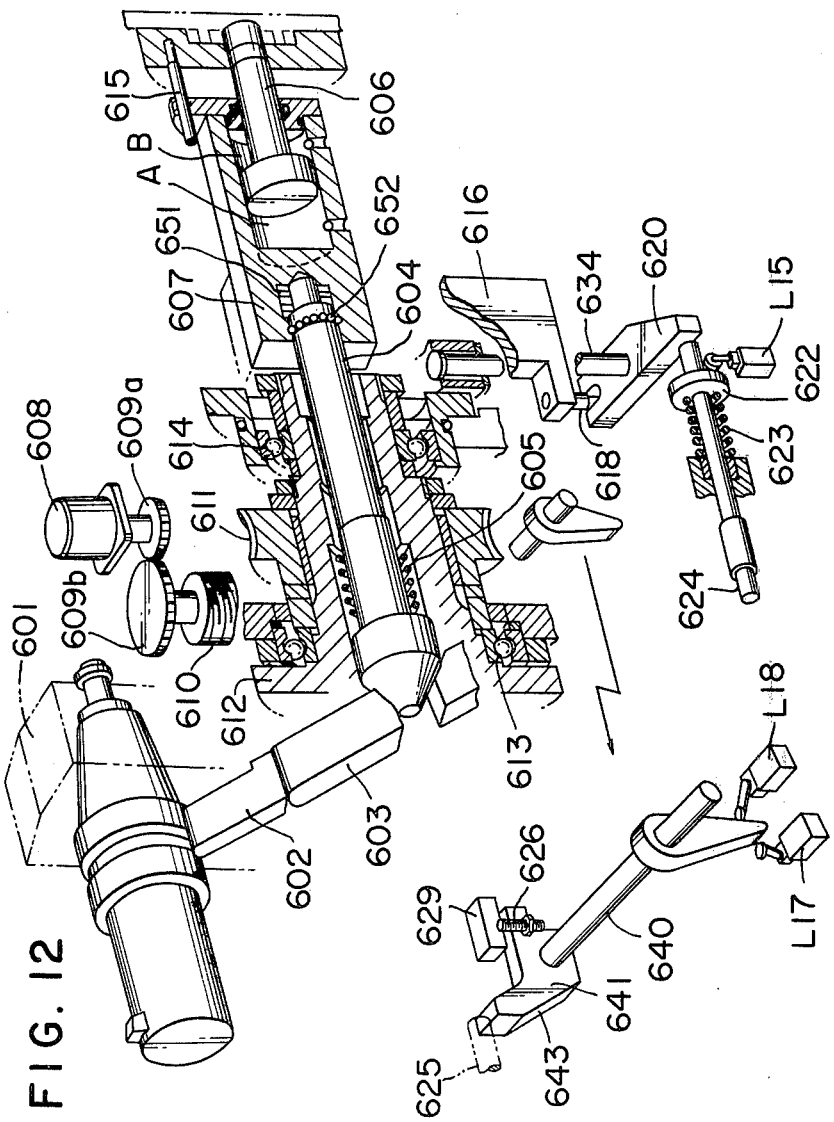
FIG. 12 is a perspective exploded view of the mechanism for driving and controlling the arm of the tool exchanging mechanism of the apparatus shown in FIG. 2.

FIG. 12 shows the details of the second tool exchanging mechanism 600, in which the hollow shaft 612 is rotatably supported by the swing block 631 by bearings 613 and 614 and the flange portion of the shaft 612 is in contact with the arm 601. A worm gear 611 is mounted coaxially on shaft 612 to engage with a worm 610 which is rotated by a hydraulic motor 608 through reduction gears 609a and 609b. A slide shaft 604 is inserted throughout the cylindrical hollow shaft 612 along the axis thereof and inner end of this shaft 604 is connected to a hydraulic cylinder-piston assembly 607 through a thrust bearing 651 and a ball joint 652.

The cylinder 607 contains one end of a piston rod 606, the other end of which is secured to the block 631, and the cylinder 607 is provided with a through hole at its base flange portion through which a guide pin 615 projecting from the block 631 is inserted to prevent the rotation of the cylinder 607. A compression spring 605 is housed in the hollow shaft 612 to always urge the slide shaft 604 leftwardly as viewed in FIG. 12. When the hydraulic pressure in the chamber A of the cylinder 607 is rised, the cylinder is moved leftwardly together with the slide shaft 604 and the tapered front end of the shaft 604 abuts against one end of a pin 603 which is slidably disposed in the arm 601. A clamp shoe 602 is provided for the other end of the pin 603. Accordingly, when the shaft 604 moves leftwardly, the pin 603 is forced upwardly by the tapered surface of the shaft 604 and the clamp shoe 602 is then pushed against the tool holding portion of the arm 601. This tool holding portion is not shown, but has substantially the same shape as that of the arm assembly 201 and serves to hold the tool.

Besides this locking mechanism, the second tool exchanging mechanism 600 includes a stop mechanism for stopping the arm 601 at its vertical position when the arm 601 rotates clockwisely under the un-locked condition of the locking mechanism and a mechanism for horizontally maintaining the arm 601 which allows to rotate the arm 601 clockwisely but not unti-clockwisely.

The stop mechanism operates in the following manner when the lock mechanism operates.

A pin 618 projecting downwardly from the lower end of a side plate 616 attached to the cylinder 607 moves vertically in accordance with the movement of the cylinder 607 and the pin 618 is loosely inserted into the notch formed at one end of a link plate 620 pivotably supported by a shaft 634. The other end of the link plate 620 abuts against one end of a stop pin 624 which is always urged towards the link plate 620 by means of a compression spring 623.

In the tool holding state where the cylinder 607 is forwardly (leftwardly in FIG. 12) positioned and the clamp shoe 602 extends in the holding portion of the arm 601, since the stop pin 624 does not project from the block 631 by the action of the spring 623, the arm 601 is rotated. However, when pressurized oil is fed to the cylinder 607 so as to move it backwardly, the pin 618 is moved backwardly together therewith thereby clockwisely rotating the link plate 620. Thus, the stop pin 624 is leftwardly moved against the force of the spring 623 and the front end of this pin 624 projects from the block 631 and abuts against a block, not shown, projecting from the rear side of the arm 601 to vertically stop the arm 601 when it is clockwisely rotated.

The mechanism for horizontally maintaining the arm 601 operates to allow free clockwise rotation of the arm but to hold it at the horizontal position when the rotation of the arm 601 is reversed to rotate anti-clockwisely. This mechanism comprises a swing shaft 640 rotatably supported by the block 631 so that the shaft 640 extends at right angles with respect to the shaft 612. One end of this shaft 640 is secured to a stop member 641 having a tapered surface 643 on its one side, and a stop screw 626 is screwed on the other side thereof, the top end of the screw 626 abutting against a stationary member 629 projecting from the block 631.

An engaging pin 625 projecting from the rear side of the arm 601 abuts against the side surface of the stop member 641 when the arm 601 is clockwisely rotated, and the stop member 641 is rotated when the pin 625 moves upwardly along the tapered side surface 643 in accordance with the clockwise rotation of the arm 601, thus rotating the stop member 641 in the direction to separate the stop screw 626 away from the stationary member 629. Accordingly, the arm 601 is clockwisely rotated without being prevented by the stop mechanism described before. However, when the arm 601 is anti-clockwisely rotated and reaches its horizontal position, the pin 625 engages with the upper surface of the stop member 641, as shown in FIG. 12, to stop the rotation of the arm 601, thus maintaining the horizontal position of the arm.

With reference now to FIGS. 13a through 13f, the new tool in the tool pot 502 is exchanged with the used tool on the spindle by using the second exchanging mechanism 600 in the following manner.

Figure 13A:
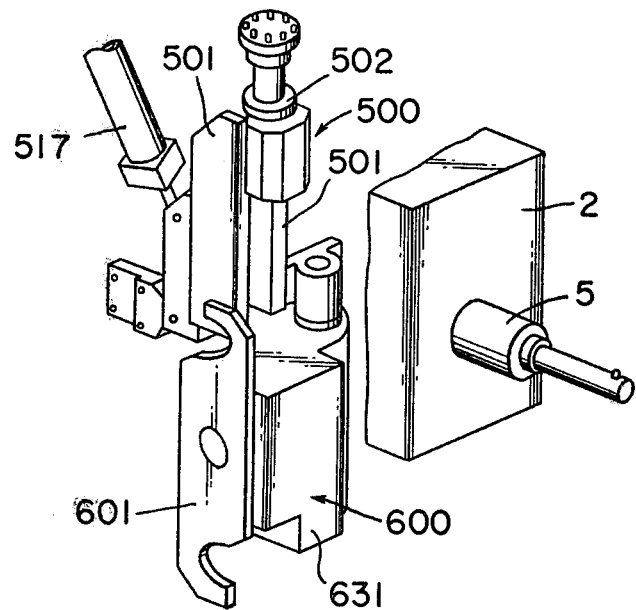
FIGS. 13a through 13f are schematic perspective views explaining successive operations of the tool exchanging mechanism shown in FIG. 8.

In FIG. 13a, the tool pot 502 receives and holds at its uppermost position, the new tool from the arm 404 of the vertical tool conveying mechanism 400, and at this time, the swing block 631 of the second tool exchanging mechanism 600 does not start to rotate and the arm 601 is positioned on one side of the spindle head 2.

Figure 13B:
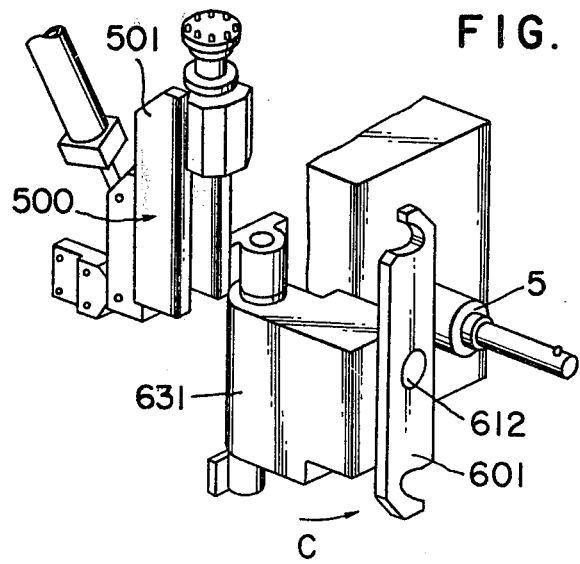

FIG. 13b shows a condition in which the block 631 is rotated by 90° by the hydraulic piston-cylinder assembly 632 to move the arm 601 to the position where the hollow shaft 612 becomes parallel with the spindle in a horizontal plane.

Figure 13C:
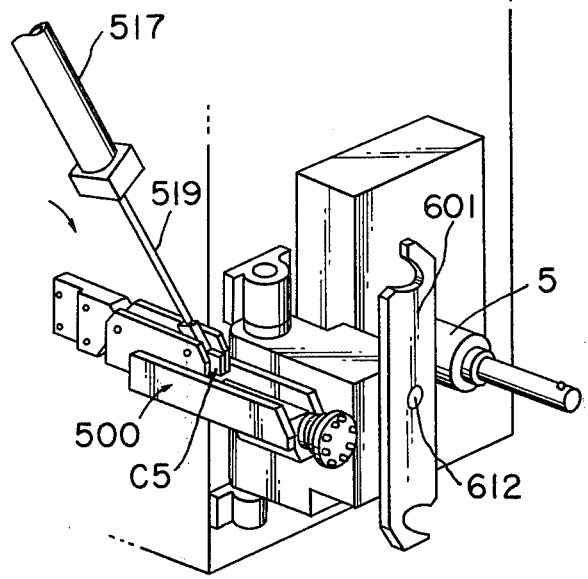

In the next step, as shown in FIG. 13c, the intermediate tool pot mechanism 500 is forwardly tilted by 90° by moving the piston rod 519 of the hydraulic piston-cylinder assembly 517. In this manner, the tool held in the pot mechanism 500 is positioned in parallel to the spindle 5 in a horizontal plane, and the distance from the hollow shaft 612 to the used tool mounted on the spindle is equal to the distance from the hollow shaft 612 to the new tool held in the pot 502 of the pot mechanism 500. The arm 601 is not driven at this time and still maintains its original vertical position.

Figure 13D:
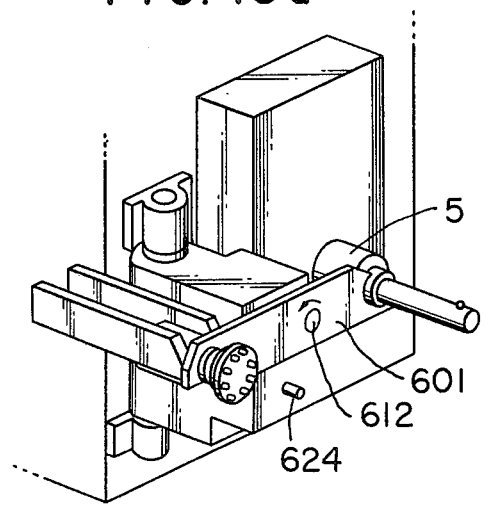
Figure 13E:
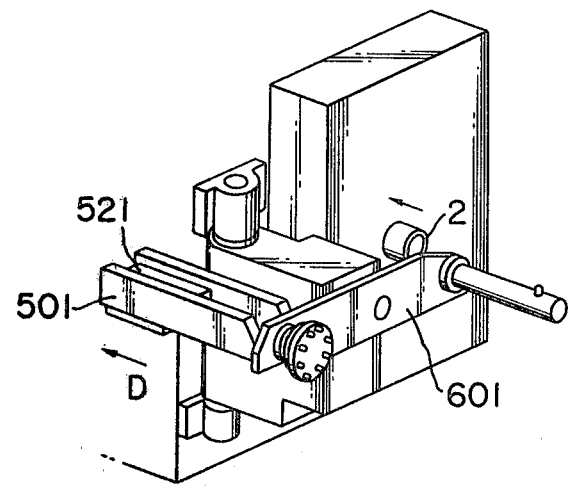

Then, the arm 601 is anti-clockwisely rotated by 90°, as shown in FIG. 13d, to hold the new and used tools by the holding portions formed at both ends of the arm 601. After holding these tools, when the cylindrical member 521 moves backwardly (in a direction shown by an arrow D in FIG. 13d) along the guide rails 501, the spindle 5 is also moved backwardly and the tools are separated from the member 521 and the spindle 5, respectively. When the cylindrical member 521 moves backwardly, the lock pins 512 in contact with the pullstud as the tool are disengaged therefrom in a direction opposite to that described before when it is locked.

Figure 13F:
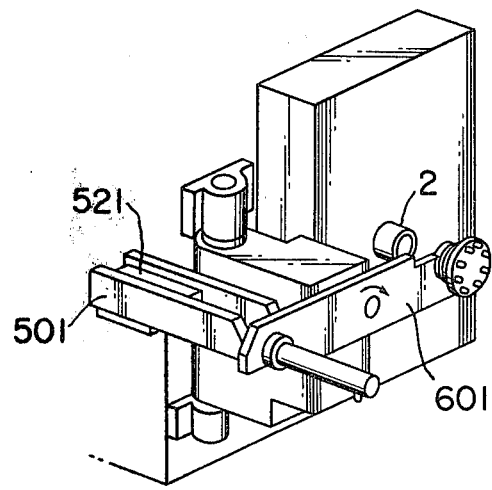

Under the condition in which both tools are separated from the supporting members, i.e. the cylindrical member 521 and the spindle 5, and held by the arm 601, the arm 601 is rotated by 180° to the position shown in FIG. 13f, thus exchanging the positions of the tools, respectively. The cylindrical member 521 and the spindle 5 are again moved forwardly to hold the used tool and the new tool, respectively. The arm 601 is then clockwisely rotated by 90° and the tool pot mechanism 500 returns to its vertical position.

The sequence of operations of the tool conveying mechanism and the tool exchanging mechanisms described hereinbefore will be described hereunder in conjunction with the circuit diagrams shown in FIGS. 14a through 14c together with FIGS. 1 through 13f.

The tool storing magazine 100 shown in FIG. 2 is driven by the hydraulic motor 110 through the sprocket 106. A number of tool pots 102 in the magazine 100 are clockwisely rotated by the rotation of the motor 110 controlled by an electromagnetic valve $V_1$ operated by tool calling instructions. Then, the code surface detecting device 108 operates to select the designated tool and generates an electric signal. In response to this signal, the desired code surface is detected and an electromagnetic valve $V_3$ for reducing the rotational speed of the tool pots 102 operates to slow down the rotational speed thereof and to stop the pots 102 by a stopping member, not shown. An electromagnetic valve $V_2$ for reversing the rotation of the tool pots 102 then operates to anticlockwisely rotate them at a low speed in accordance with an electric signal informing that the pots 102 have been stopped and to stop them so as to accurately position the selected pot 102 at the tool exchanging position by a mechanical stopping member, not shown.

On the other hand, in the above operation, the used tool is held in the pot carrier 302 which had already been moved in front of the tool exchanging position of the magazine 100. An electromagnetic valve $V_4$ is energized by a signal generated at the time when the selected tool pot 102 has been stopped at the tool exchanging position and the hydraulic piston-cylinder assembly 212 is driven by the valve $V_4$. The arm member 201 is clockwisely rotated by about 90°, (strictly 85°) because the holding center of the arm member 201 has angles of 5° with respect to the plane passing through the center of rotation of the arm member 201 as shown in FIG. 3a, and the tools are caught by the holding portions 203 of the arm member 201, respectively. When the arm member 201 rotates clockwisely by 85°, a limit switch $L_1$ is closed and an electromagnetic valve $V_5$ is energized. The hydraulic piston-cylinder assembly 214 is then operated to upwardly move the arm member 201 with the tools, and when a limit switch $L_2$ detects that the arm member 201 reaches its uppermost position, an electromagnetic valve $V_6$ is energized and a hydraulic piston-cylinders assembly 213 is then driven to clockwisely rotate the arm member 201 by 180° by the engagement of the rack with the pinion thereby changing the positions of the new tool and the used tool. When the arm member 201 is completely rotated by 180°, a limit switch $L_3$ is closed and the electromagnetic valve $V_5$ is deenergized, so that the arm member 201 is lowered to return to its original position. The new tool and the used tool exchanged their positions by 180°, respectively, are then inserted into the pot of the pot carrier 302 and the tool pot 102 of the magazine 100, respectively. When this tool exchanging operation has been completed, a limit switch $L_4$ is closed and the electromagnetic valve $V_4$ is deenergized.

The arm member 201, after releasing the tools, is anti-clockwisely rotated by about 90° to return to its original position. The tool exchanging operation is performed during the actual milling or boring operation with the tool mounted on the spindle, and when the milling or boring operation has been finished, a tool exchanging instruction is generated.

In response to this instruction, an electromagnetic valve $V_7$ for driving the cover 407 of the rotary shaft 403 is energized and a hydraulic motor $M_4$ is driven thereby rotating the cover 407 to enable the arm 404 to move upwardly. At the same time, an electromagnetic valve $V_8$ is energized and the hydraulic piston-cylinder assembly 310 is backwardly moved. Then, the cover 308 covering the guide bars 301 is rotated to the position shown by dotted lines in FIG. 5 to enable the carrier 302 to move horizontally. When the cover 407 is fully opened, a limit switch $L_6$ is closed to energize an electromagnetic valve $V_9$ forwardly (rightwardly as viewed in FIG. 3a) moving the pot carrier 302. When the hydraulic motor $M_2$ is driven thereby to drive the chain 303, the carrier 302 holding the new tool is horizontally moved towards the position near the vertical tool conveying mechanism 400. When the carrier 302 approaches to its end position, a reducing valve $V_{10}$ is operated to reduce the rotational speed of the motor $M_2$, and the carrier 302 is also slowed down and stopped by a mechanical stopping member, not shown.

A limit switch $L_7$ is closed when the carrier 302 stops, and an electromagnetic valve $V_{11}$ is energized. Then, a hydraulic piston-cylinder assembly $C_3$ is operated to anti-clockwisely rotate the arm 404 of the vertically tool conveying mechanism 400 by about 40° from the leftwardly inclined portion shown in FIG. 7 by imaginary lines and to hold the tool by the arm 404. While the tool is held, a limit switch $L_8$ is closed and an electromagnetic valve $V_{12}$ is energized. The energization causes the rotation of the hydraulic motor $M_3$ to upwardly move the arm 404. When the arm 404 approaches its uppermost position, a limit switch $L_9$ is closed to reduce the speed of the motor $M_3$ through an electromagnetic valve $V_{13}$. A limit switch $L_{10}$ is closed when the arm 404 further approaches to the uppermost position. The valve $V_{12}$ is then positioned at a neutral position and the arm 404 is stopped by a stopping member 642 after a slight further upward movement of the arm 404. At the same time, an electromagnetic valve $V_{14}$ is energized and a hydraulic piston-cylinder assembly $C_3$ is operated to anti-clockwisely rotate the arm 404 by 180°, thus positioning the tool in the arm 404 above the tool pot 502. When this position is reached, a limit switch $L_{11}$ is closed and the electromagnetic valve $V_{15}$ is deenergized. Thereafter, the piston rod 510 of the piston-cylinder assembly 509 in the intermediate tool pot mechanism 500 is upwardly moved from its lower position together with the cylindrical member 521 to receive the tool held in the arm 404, and when the member 521 reaches its uppermost position, a limit switch $L_{12}$ is closed and the electromagnetic valve $V_{14}$ is deenergized thereby reversely (clockwisely) rotating the arm 404 by 180°. At the initial time of this clockwise rotation of the arm 404, the tool is automatically separated from the arm 404 and held in the cylindrical member 521. After completely rotating the arm 404 by 180°, an electromagnetic valve $V_{16}$ is energized and a hydraulic piston-cylinder assembly 517 is operated thereby forwardly tilting the cylindrical member 521 by 90° together with the tool held therein. The reason why the member 521 is tilted is that the block 631 of the tool exchanging mechanism 600 has previously been rotated by 90° by the operation of an electromagnetic valve $V_{17}$ and a hydraulic piston-cylinder assembly 632 to close a limit switch $L_{25a}$ when a limit switch $L_{13}$ is closed.

Referring to FIG. 14c, a hydraulic piston-cylinder assembly $C_5$ includes a piston rod contacting to the bottom of the cylindrical member 521 so as to prevent the lowering of the piston rod 510 of the piston-cylinder assembly 509 when the oil pressure is extinguished in a case, such as of power service interruption. Namely, when the pot mechanism 500 is forwardly tilted by 90° the limit switch $L_{13}$ is closed, an electromagnetic valve $V_{18}$ is energized and a hydraulic motor 108 is operated to anti-clockwisely rotate the arm 601 for holding the new tool in the cylindrical member 521 by one of the holding portions of the arm 601 and for holding the used tool on the spindle 5, by the other holding portion thereof. This rotation of the arm 601 closes a limit switch $L_{14}$, energizes an electromagnetic valve $V_{19}$ and operates a hydraulic piston-cylinder assembly 607. When this assembly 607 operates, the stop mechanism of the arm 601 is un-locked and the clamp mechanism is operated to hold the tool by the arm 601.

Responsive to the movement of the piston-cylinder assembly 607, a limit switch $L_{15}$ is closed and the spindle 5 is retracted. At the same time, the electromagnetic valve $V_{15}$ is energized and the hydraulic piston-cylinder assembly 509 is operated thereby rotating the cylindrical member 521.

At the next step, a limit switch $L_{16}$ is closed by the retraction of the member 521 and an electromagnetic valve $V_{18}$ is deenergized to reversely rotate the motor 608, thus clockwisely rotating the arm 601 by $(180+\alpha)°$. When the limit switch $L_{17}$ detects the rotational angle $\alpha°$, the motor 608 is started again to rotate anti-clockwisely by the operation of the valve $V_{18}$ thereby anti-clockwisely rotating the arm 601 by $\alpha°$.

That is, in order to acurately rotate the arm 601 by 180° for changing the positions of the tools by 180°, it is desired that the arm 601 be first rotated by $(180+\alpha)°$ and then backwardly rotated by $\alpha°$ to stop the arm to a predetermined position in which the pins 625 of the arm 601 engages with the stopping member 641. At this time, the limit switch $L_{14}$ is operated to advance the spindle 5 for holding the new tool. The electromagnetic valve $V_{15}$ is then deenergized to operate the hydraulic piston-cylinder assembly 509. The cylindrical member 521 also advances and holds the used tool.

When the cylindrical member advances, the hydraulic piston-cylinder assembly 607 is moved rightwardly as viewed in FIG. 12 through the operations of the limit switch $L_{12}$, and the electromagnetic valve $V_{19}$ thereby backwardly moving the clamp shoe 602 and releasing the clamp mechanism. Then, the stop pin 624 projects to enable the stop mechanism to operate. Subsequently, the electromagnetic valve $V_{18}$ is deenergized by the operation of the limit switch $L_{12}$ and the arm 601 is rotated clockwisely by 90° to release the tool therefrom. The arm is kept at its vertical position by means of the stop pin 624. An electromagnetic valve $V_{20}$ is energized by the operation of a limit switch $L_{12}$ and the hydraulic piston-cylinder assembly 517 is driven thereby rotating the cylindrical member 521 by 90° to position vertically the tool. In response to the rotation of the member 521, a limit switch $L_{19}$ is closed and the block 631 is rotated by 90° and moved below the intermediate tool pot mechanism 500 by the operations of the electromagnetic valve $V_{17}$ and the hydraulic piston-cylinder assembly 632. At substantially the same time, a limit switch $L_{20}$ is closed and the arm 404 is anti-clockwisely rotated by 180° to hold the used tool by the holding portion of the arm 404. By the rotation of this arm, the limit switch $L_{11}$ is closed and the electromagnetic valve $V_{15}$ is energized to operate the hydraulic piston-cylinder assembly 509 and to lower the cylindrical member 521. Then, the arm 404 is clockwisely rotated by 180° by the operations of the electromagnetic valve $V_{14}$ and the hydraulic piston-cylinder assembly $C_4$. In the next stage, although an electromagnetic valve $V_{21}$ is energized and the motor $M_3$ is rotated to lower the arm 404, the rotational speed of the motor $M_3$ is reduced by a reducing valve $V_{13}$ operated by the limit switch $L_{21}$ when the arm 404 moves towards the position near its lowermost position, and when the arm 404 reaches the lowermost position, a limit switch $L_{22}$ is closed. Then, the used tool hold in the arm 404 is inserted into the pot 311 of the pot carrier 302. When the electromagnetic valve $V_{11}$ is deenergized to reduce the pressure in the hydraulic piston-cylinder assembly $C_3$, the assembly is moved backwardly by the operation of the hydraulic piston-cylinder assembly $C_4$ thereby clockwisely rotating the arm 404 by 40° to the position shown by the lower imaginary lines in FIG. 7. A limit switch $L_{23}$ is then closed and an electromagnetic valve $V_{22}$ is energized to reversely rotate the motor $M_2$, thus backwardly moving the pot carrier 302 holding the used tool towards the position in front of the exchanging position of the tool storing magazine 100. The pot carrier 302 is slowed down and stopped by the operation of the reducing valve $V_{23}$. When the pot carrier 302 stops, a limit switch $L_{24}$ is closed and the covers for covering the rotary shaft 403 and the guide bars 301 are closed respectively by a motor $M_4$ and a hydraulic piston-cylinder assembly 310. When the cover 407 for the rotary shaft 403 is closed, a limit switch $L_{25}$ is closed. At this time, the pot carrier is maintained at the position for returning the used tool in the pot 102 of the magazine 100, and the used tool is returned thereinto by the operation of the arm assembly 201 when the next tool calling instruction is generated. The newly designated tool is exchanged with the used tool and transferred into the pot carrier 302.

During the milling or boring operation of the machine tool, the used tool is returned to the tool pot 102 of the magazine and a desired new tool is selected, thus shortening the working time for exchanging the tools.

Figure 14B:
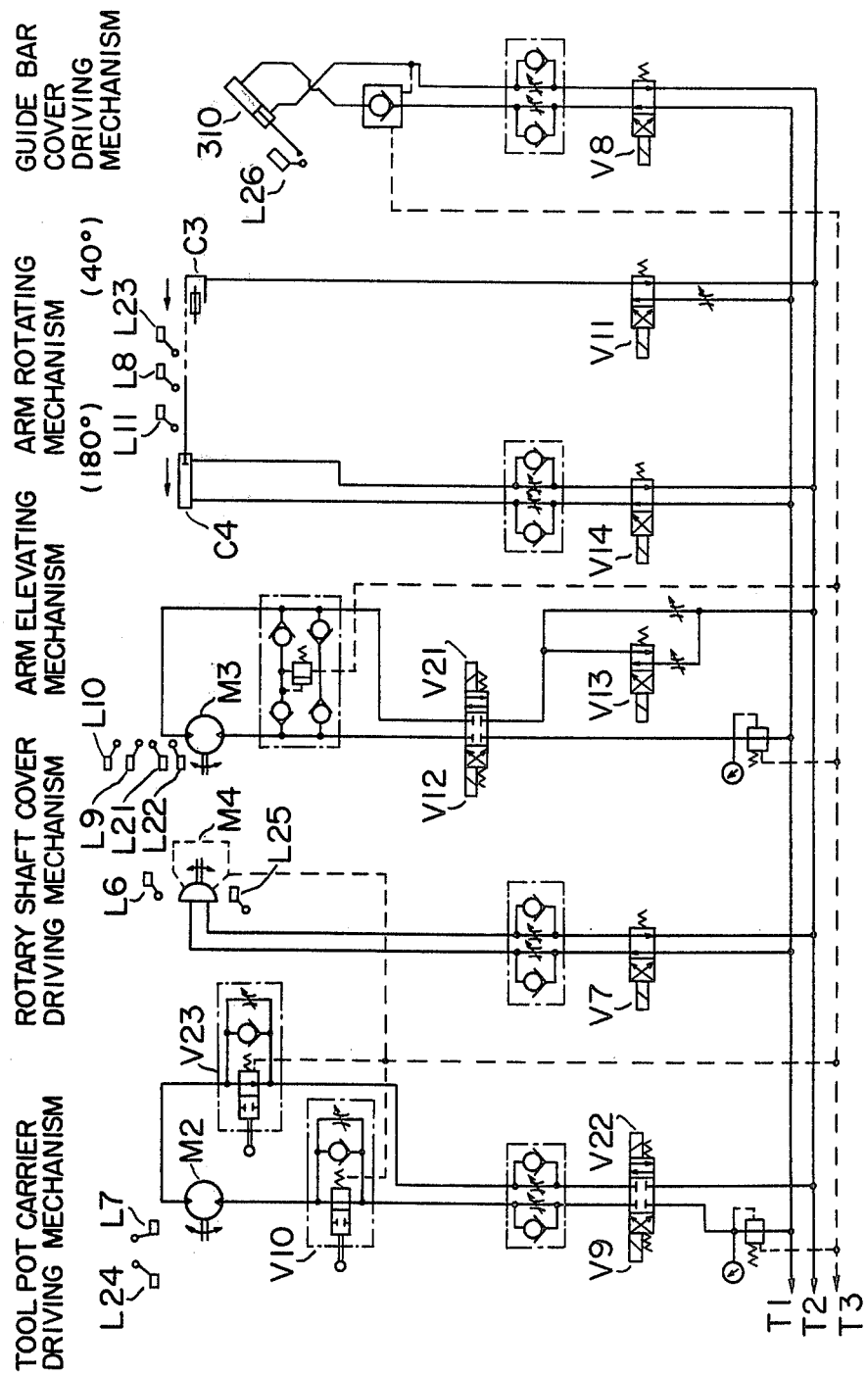

With reference to FIGS. 14a through 14c, the control circuit shown in FIG. 14a is connected to that in FIG. 14b through lines $T_1$, $T_2$ and $T_3$ and both circuits are operated by a common oil pressure supplying source $S_1$. The control circuit shown in FIG. 14c is operated by a source of oil pressure $S_2$. A limit switch $L_{26}$ shown in FIG. 14b is used for detecting the time when the cover 308 reaches the position to be closed by the operation of the hydraulic piston-cylinder assembly 509.

According to the embodiment of this invention described hereinabove, although the tool is exchanged by rotating the swing block 631 horizontally by 90° to move the arm 601 to the predetermined position, it is possible to fix the block 631 and locate the arm 601 in front of this block.

As is apparent from the foregoing descriptions, in the automatic tool exchanging apparatus according to this invention, since the tool is vertically held with its shank downwardly directed when it is conveyed from the tool storing magazine 100 to the tool exchanging mechanism located near spindle 5 and the tool is rotated horizontally for the first time at the position near the spindle 5, the tool is always stably and securely conveyed.

Furthermore, in the use of this tool exchanging apparatus, a tool having a weight more than 100 kg can be safely and readily handled, thus eliminating dangers liable to be caused when the tools are manually exchanged and greatly shortening the time of exchaging.

We claim:

1. An automatic tool exchanging apparatus of a machine tool having a base, a column mounted on said base, a spindle head located on one of said column and movable therealong and a spindle supported by said spindle head to be movable in the axial direction comprising:
   a tool storing magazine mounted on said base and provided with a number of tool holders in which tools are vertically supported with their shanks downwardly directed;
   first tool exchanging means located in front of a selected tool exchanging holder of said tool storing magazine when tools are to be exchanged;
   horizontal tool conveying means connected to said first tool exchanging means and extending horizontally with respect to said magazine for horizontally conveying a tool with its shank downwardly directed;
   vertical tool conveying means connected to said horizontal tool conveying means and extending along said column of the machine tool for vertically conveying the tool;
   an intermediate tool pot mechanism pivotably supported on one side of said spindle head for receiving the tool from said vertical tool conveying means with its shank downwardly directed; and
   second tool exchanging means located on one side of said vertical tool conveying means for transferring the tool from said intermediate tool pot mechanism to said spindle after horizontally rotating the tool.

2. Apparatus according to claim 1 wherein said first tool exchanging means comprises a rotatable tool exchanging arm assembly provided at its both ends with tool holders for holding a tool in a selected tool holder of said tool storing magazine and a tool in said horizontal tool conveying means, respectively.

3. Apparatus according to claim 2 wherein said arm assembly comprises two cantilever type arms each provided with a tool holder at its free end.

4. Apparatus according to said claim 1 wherein said horizontal tool conveying means is provided with guide bars along which the horizontal tool conveying means horizontally moves and with a cover driven by a hydraulic cylinder-piston assembly pivotably supported by said column for covering said guide bars when said horizontal tool conveying means is positioned to the tool exchanging position in front of said magazine, said cover being opened when said horizontal tool conveying means moves horizontally.

5. Apparatus according to claim 1 wherein said vertical tool conveying means comprises a rotary shaft, a tool conveying arm which is pivotably supported by said rotary shaft and vertically moved by the rotation of said rotary shaft, said tool conveying arm being provided with a tool holder at its free end for receiving a tool from said horizontal tool conveying means and a cover is disposed outside of said rotary shaft therealong for covering said rotary shaft when said tool conveying arm is positioned at the lower-most position of said vertical tool conveying means, said cover being opened when said tool conveying arm is vertically moved.

6. Apparatus according to claim 1 wherein said intermediate tool pot mechanism comprises a tool pot removably holding a tool, guide rails for vertically moving said tool pot therealong, means for driving said tool pot along said guide rails, means for tilting said tool pot mechanism, and means for holding or releasing the tool to or from said tool pot in response to the movement of said tool pot.

7. Apparatus according to claim 1 wherein said second tool exchanging means comprises a block pivotably connected to said intermediate tool pot mechanism, a tool exchanging arm rotatably mounted on said block, a lock mechanism for holding a tool in said tool exchaning arm, a stop mechanism for vertically supporting said tool exchanging arm when said lock mechanism is released, and means for maintaining said tool exchanging arm to its horizontal positions so that the clockwise rotation of said tool exchanging arm is allowed, but said tool exchanging arm is maintained to its horizontal position when it is rotated anti-clockwisely.

* * * * *